United States Patent [19]

Maki et al.

[11] Patent Number: 5,201,047
[45] Date of Patent: Apr. 6, 1993

[54] ATTRIBUTE-BASED CLASSIFICATION AND RETRIEVAL SYSTEM

[75] Inventors: Reino A. Maki, Marietta; Sujan K. Mukherjee, Roswell, both of Ga.

[73] Assignee: International Business Machines Corporation, Armonk, N.Y.

[21] Appl. No.: 452,227

[22] Filed: Dec. 21, 1989

[51] Int. Cl.$^5$ .................. G06F 15/413; G06F 15/411
[52] U.S. Cl. .................. 395/600; 364/282.1; 364/282.3; 364/283.2; 364/283.3; 364/283.4; 364/284.2; 364/225.4; 364/226.6
[58] Field of Search ............... 364/513, 468, 900, 200

[56] References Cited

U.S. PATENT DOCUMENTS

| | | | |
|---|---|---|---|
| 4,631,664 | 12/1986 | Bachman | 364/283.3 |
| 4,752,889 | 6/1988 | Rappaport et al. | |
| 4,870,591 | 9/1989 | Cicciarelli et al. | 395/12 |
| 4,905,163 | 2/1990 | Garber et al. | 364/283.1 |
| 5,021,997 | 6/1991 | Archie et al. | 364/DIG. 2 |

*Primary Examiner*—David L. Clark
*Assistant Examiner*—Wayne Amsbury
*Attorney, Agent, or Firm*—John J. Timar

[57] ABSTRACT

An attribute-based automated classification and retrieval system for group technology applications using a codeless classification system in which hierarchical classification structures are stored in a classification attribute file and in which searches can be performed at any level in the classification structure. The relationship between entities and classification attributes are kept in an item classification parameters file along with the parameter values associated with each entity-attribute pair. Queries on the data stored in the classification attribute file and item classification parameters file are stored alternately in a plurality of query results files as successive queries are used to narrow the scope of a search.

8 Claims, 13 Drawing Sheets

FIG. 2

| CLASSIFICATION ATTRIBUTES | | | | PARENT ATTRIBUTE IDENTIFIER | ATTRIBUTE USAGE COUNT |
|---|---|---|---|---|---|
| IDENTIFIER | DESCRIPTION | LEVEL NO. | LEAF NODE | | |
| FUNCTION | Function | 0 | No | | 10000 |
| ELECTRICAL | Elec. Parts | 1 | No | FUNCTION | 4000 |
| MECHANICAL | Mech. Parts | 1 | No | FUNCTION | 6000 |
| FASTENER | Fastener | 2 | No | MECHANICAL | 1000 |
| BEARING | Bearing | 2 | No | MECHANICAL | 1000 |
| PULLEY | Pulley | 2 | No | MECHANICAL | 1000 |
| VBELT | 'V' Belt | 2 | No | MECHANICAL | 1000 |
| GEAR | Gear | 2 | No | MECHANICAL | 1000 |
| BRACKET | Bracket | 2 | No | MECHANICAL | 1000 |
| SCREW | Screw | 3 | Yes | FASTENER | 300 |
| RIVET | Rivet | 3 | Yes | FASTENER | 200 |
| BOLT | Bolt | 3 | Yes | FASTENER | 300 |
| NUT | Nut | 3 | Yes | FASTENER | 300 |
| BALL | Ball | 3 | Yes | BEARING | 700 |
| ROLLER | Roller | 3 | No | BEARING | 300 |
| FLAT | Flat | 3 | No | PULLEY | 500 |
| VGROOVED | 'V' Grooved | 3 | No | PULLEY | 500 |
| STRAIGHT | Straight | 4 | Yes | ROLLER | 200 |
| TAPERED | Tapered | 4 | Yes | ROLLER | 100 |
| SINGLESTEP | Single Step | 4 | Yes | FLAT | 200 |
| MULTISTEP | Multi-Step | 4 | No | FLAT | 300 |
| SINGLESTEP | Single Step | 4 | Yes | VGROOVED | 300 |
| MULTISTEPS | Multi-Steps | 4 | No | VGROOVED | 200 |
| 2STEPS | 2 Steps | 5 | Yes | MULTISTEP | 100 |
| 3STEPS | 3 Steps | 5 | Yes | MULTISTEP | 100 |
| 4STEPS | 4 Steps | 5 | Yes | MULTISTEP | 100 |
| 2STEPS | 2 Steps | 5 | Yes | MULTISTEPS | 100 |
| 3STEPS | 3 Steps | 5 | Yes | MULTISTEPS | 100 |

FIG. 3

| ITEM IDENTIFIER | CLASSIFICATION ATTRIBUTE IDENTIFIER |
|---|---|
| FASTENER058472964 | SCREW |
| FASTENER058472964 | MOLYBDENUM |
| FASTENER058472964 | TOLERANCE CATEGORY 2 |
| FASTENER058472964 | FINE PITCH |

FIG. 4A

```
FUNCTION
— ELECTRICAL
— MECHANICAL
— — FASTENER
— — — SCREW
— — — RIVET
— — — BOLT
— — — NUT
— — BEARING
— — — BALL
— — — ROLLER
— — — — STRAIGHT
— — — — TAPERED
— — PULLEY
— — — FLAT
— — — — SINGLESTEP
— — — — MULTISTEP
— — — — — 2STEPS
— — — — — 3STEPS
— — — — — 4STEPS
— — — VGROOVED
— — — — SINGLESTEP
— — — — MULTISTEPS
— — — — — 2STEPS
— — — — — 3STEPS
— — V BELT
— — GEAR
— — BRACKET
```

```
- SHAPE
- LINEAR
- - CYLINDRICAL
- - HEX SECTION
- - RAIL SECTION
- - SPECIAL SECTION
- FLAT
- - SQUARE
- - RECTANGULAR
- - HEXAGONAL
- - CIRCULAR
- - MULTIDIMENSIONAL
- CUBICAL
- SPHERICAL
- CONICAL
- COMPLEX 3 DIMENSIONAL
```

FIG. 4B

```
MATERIAL
- METAL
- - FERROUS
- - - CAST IRON
- - - STEEL
- - - - MILD
- - - - HIGH CARBON
- - - - HIGH SPEED
- - - - - MOLYBDENUM
- - - - - TUNGSTEN
- - NONFERROUS
- - - BRASS
- - - COPPER
- WOOD
- RUBBER
- PLASTIC
```

FIG. 4C

```
THREAD
 — METRIC
 — —  OUTER THREAD
 — — —  FINE PITCH
 — — —  STANDARD PITCH
 — —  INNER THREAD
 — — —  FINE PITCH
 — — —  STANDARD PITCH
 — —  PIPE THREAD
 — BSW
 — —  OUTER THREAD
 — — —  FINE PITCH
 — — —  STANDARD PITCH
 — —  INNER THREAD
 — — —  FINE PITCH
 — — —  STANDARD PITCH
 — —  PIPE THREAD
```

FIG. 4D

```
FINISH
 — COARSE
 — —  TOLERANCE CATEGORY 1
 — —  TOLERANCE CATEGORY 2
 — —  TOLERANCE CATEGORY 3
 — MEDIUM PRECISION
 — —  TOLERANCE CATEGORY 1
 — —  TOLERANCE CATEGORY 2
 — —  TOLERANCE CATEGORY 3
 — HIGH PRECISION
 — —  TOLERANCE CATEGORY 1
 — —  TOLERANCE CATEGORY 2
 — —  TOLERANCE CATEGORY 3
```

FIG. 4E

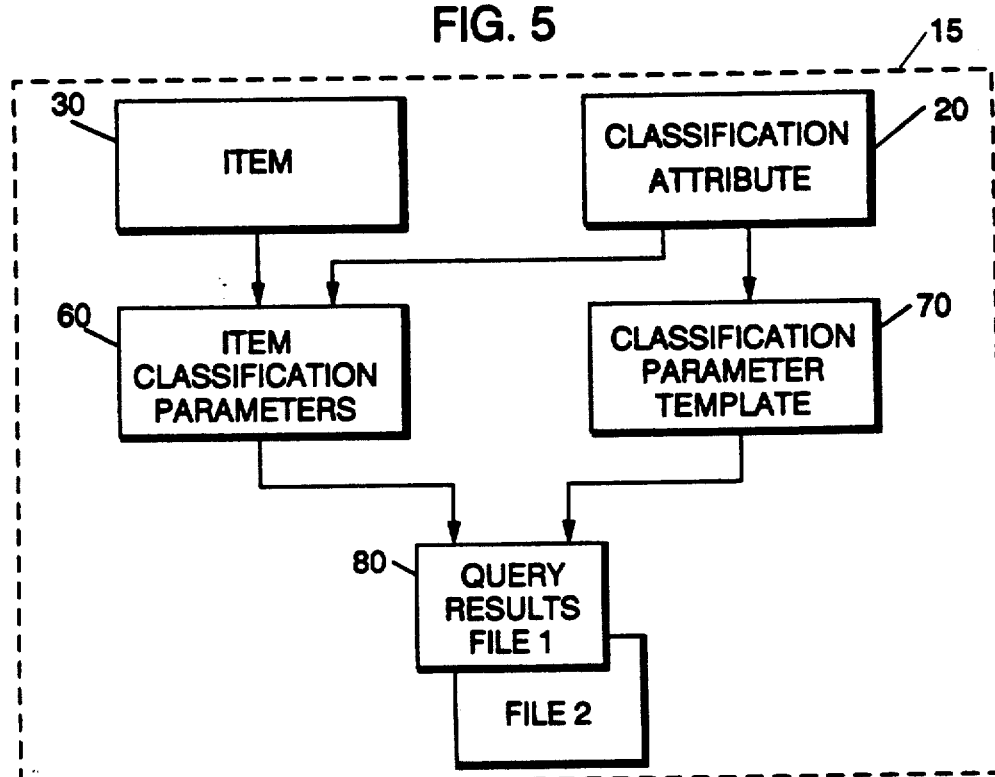

| CLASSIFICATION | | PARAMETER NAMES | | | | |
|---|---|---|---|---|---|---|
| CLASS CODE | ATTRIBUTE IDENTIFIER | PARA-METER 1 | PARA-METER 2 | PARA-METER 3 | PARA-METER 4 | PARA-METER 5 |
| ITEM | MECHANICAL | LENGTH | | | | |
| ITEM | FASTENER | LENGTH | DIAMETER | HEAD TYPE | | |
| ITEM | RIVET | LENGTH | DIAMETER | HEAD TYPE | | |
| ITEM | NUT | LENGTH | DIAMETER | HEAD TYPE | | |
| ITEM | BOLT | LENGTH | DIAMETER | HEAD TYPE | THREAD LEN | |
| ITEM | SCREW | LENGTH | DIAMETER | HEAD TYPE | THREAD LEN | SLOT TYPE |
| ITEM | COARSE | DIMENSN1 | DIMENSN2 | PLATING | | |
| ITEM | TOLER_CAT2 | DIMENSN1 | DIMENSN2 | PLATING | DIMENSN3 | DIMENSN4 |

FIG. 7

| ITEM IDENTIFIER | CLASSIFICATION ATTRIBUTE IDENTIFIER | PARAMETER 1 | | | |
|---|---|---|---|---|---|
| | | DESCRIP. VALUE | UOM | MIN. VALUE | MAX. VALUE |
| FASTENER0584729964 | SCREW | | | | |
| FASTENER0584729964 | MOLYBDENUM | | | | |
| FASTENER0584729964 | TOLER CAT2 | MID | CM | 2.500 | 2.500 |
| FASTENER0584729964 | FINE PITCH | LENGTH | CM | -0.01 | +0.01 |
| | | | MM | 3.00 | 3.00 |

| PARAMETER 2 | | | |
|---|---|---|---|
| DESCRIP. VALUE | UOM | MIN. VALUE | MAX. VALUE |
| DIAMETER | MM | 3.000 | 3.000 |
| DIAMETER | MM | -0.02 | +0.02 |

| PARAMETER N | | | |
|---|---|---|---|
| DESCRIP. VALUE | UOM | MIN. VALUE | MAX. VALUE |
| | | | |
| | | | |

FIG. 8A

ITEM CLASSIFICATION

ITEM ID: FASTENER058472964
ITEM DESC: SCREW 2.5 CM LONG 3.0 MM DIA

| ITEM ATTRIBUTES DESCRIPTIVE VALUE | UOM | MIN. VALUE | MAX. VALUE |
|---|---|---|---|
| ROOT ATTRIBUTE FUNCTION | | | |
| LEVEL 1 ATTRIBUTE MECHANICAL | | | |
| LEVEL 2 ATTRIBUTE FASTENER | | | |
| LEVEL 3 ATTRIBUTE SCREW | | | |
| LENGTH | CM | 2.5000 | 2.5000 |
| DIAMETER | MM | 3.0000 | 3.0000 |
| THREAD LENGTH | CM | 2.5000 | 2.5000 |
| HEAD TYPE ROUND | | | |
| SLOT TYPE PHILLIP | | | |

FIG. 8B

| ITEM CLASSIFICATION | | | |
|---|---|---|---|

ITEM ID: FASTENER058472964
ITEM DESC: SCREW 2.5 CM LONG 3.0 MM DIA

| ITEM ATTRIBUTES DESCRIPTIVE VALUE | UOM | MIN. VALUE | MAX. VALUE |
|---|---|---|---|
| ROOT ATTRIBUTE<br>MATERIAL | | | |
| LEVEL 1 ATTRIBUTE<br>METAL | | | |
| LEVEL 2 ATTRIBUTE<br>FERROUS | | | |
| LEVEL 3 ATTRIBUTE<br>STEEL | | | |
| LEVEL 4 ATTRIBUTE<br>HIGH SPEED | | | |
| LEVEL 5 ATTRIBUTE<br>MOLYBDENUM | | | |
| MATERIAL<br>M10 | | | |
| | | | |
| | | | |

FIG. 8C

| ITEM CLASSIFICATION | | | |
|---|---|---|---|
| ITEM ID: FASTENER058472964 | | | |
| ITEM DESC: SCREW 2.5 CM LONG 3.0 MM DIA | | | |

ITEM ATTRIBUTES

| DESCRIPTIVE VALUE | UOM | MIN. VALUE | MAX. VALUE |
|---|---|---|---|
| ROOT ATTRIBUTE  FINISH | | | |
| LEVEL 2 ATTRIBUTE  MEDIUM PRECISION | | | |
| LEVEL 3 ATTRIBUTE  TOLERANCE  CATEGORY 2 | | | |
| DIMENSION 1  LENGTH | CM | -0.0100 | 0.0100 |
| DIMENSION 2  DIAMETER | MM | -0.0200 | 0.0200 |
| PLATING  GALVANIZED | | | |
| | | | |
| | | | |
| | | | |

FIG. 8D

| ITEM CLASSIFICATION | | | |
|---|---|---|---|
| ITEM ID: FASTENER058472964 | | | |
| ITEM DESC: SCREW 2.5 CM LONG 3.0 MM DIA | | | |

| ITEM ATTRIBUTES DESCRIPTIVE VALUE | UOM | MIN. VALUE | MAX. VALUE |
|---|---|---|---|
| ROOT ATTRIBUTE THREAD | | | |
| LEVEL 1 ATTRIBUTE METRIC | | | |
| LEVEL 2 ATTRIBUTE OUTER THREAD | | | |
| LEVEL 3 ATTRIBUTE FINE PITCH | | | |
| NOMINAL THREAD DIA | MM | 3.0000 | 3.0000 |
| | | | |
| | | | |
| | | | |
| | | | |

ATTRIBUTE-BASED CLASSIFICATION AND RETRIEVAL SYSTEM

BACKGROUND OF THE INVENTION

This invention relates to automated classification systems for group technology applications, and in particular to a codeless classification system that provides a flexible method of defining unique attributes for a specific class of entity enabling the user to query on the attribute values.

Group technology is a loosely bounded manufacturing philosophy that exploits similarities in parts for efficiency in design and manufacture. It has evolved from parts classification and coding systems that were developed for engineering design retrieval. Parts may also be classified and coded by process, tooling, set up, or any other useful feature set. Companies using group technology principles have found that it can be applied to other business functions, including marketing, purchasing, cost accounting, materials control, and customer service.

Group technology is most commonly used for parts (or items) classification. An objective of parts classification is to provide a system to classify and locate parts with similar attributes. It helps to eliminate duplicate parts with different part numbers and avoids complete redesign of parts that are very similar. Virtually all group technology implementations use computer assisted classification coding as a method of defining families of similar parts within the manufacturing enterprise. A parts classification code is a string of characters, usually digits, that specifies the design and/or manufacturing attributes of the part. Many such coding systems are commercially available.

Currently, all parts classification systems use a fixed format code that identifies specific attributes of a part in a predefined schema. The code may be intelligible to the user or machine readable only, but its format is fixed at the time the code is generated. If the schema has multiple hierarchical levels, they are reflected in the code format.

The fixed format code creates problems with maintenance as a company and its classification system change over time. There may be some room in the existing format for minor additions to existing codes, but generally any significant maintenance to the classification schema will require a time consuming reclassification of all parts. As parts classification codes are used more extensively for such group technology applications as computer aided process planning, there will be increased maintenance to the classification schema.

Current automated methods of classification systems for group technology are limited to assigning classification codes to manufactured parts or other business entities and processes. The assigned codes are then used for query purposes. General purpose query tools are inefficient for classification queries. Special purpose programs to improve the performance result in preplanned classification queries which are inflexible. A query system for classification queries that is both flexible and yields high performance is not commercially available.

Thus, there exists a need for a codeless classification system that removes the hierarchical code from the parts data, thus avoiding the time-consuming reclassification that is necessitated when the code hierarchy changes. Furthermore, there is a need for a codeless classification system which enables definition of unique attributes for a specific class of entity and allows queries on the attribute values.

SUMMARY OF THE INVENTION

It is therefore an object of this invention to provide an automated method of classification for group technology without the use of a fixed classification code system.

It is an object of this invention to provide a method for the classification of parts that is based on user-determined attributes.

It is another object of this invention to provide a classification query and retrieval system that is integrated with the codeless classification system.

It is a further object of this invention to provide a method for defining unique attributes for storing data on a specific class of entity that can be augmented readily without modification of the query program used for data retrieval.

These and other objects and advantages are achieved by this invention through the implementation of a codeless classification system for group technology applications. Classification structures in the form of hierarchies based on root attributes such as function, material, shape, size and finish are stored in a classification attribute file. Searches can be performed at any level in these hierarchical structures. Detailed item parameter values and the relationship between items and classification attributes are stored in a separate file. A classification parameter template file is used to define variable column headings for different classification attributes. Queries on the classification attributes are stored in a plurality of query results tables.

BRIEF DESCRIPTION OF THE DRAWINGS

FIG. 2 is an illustration of the classification attributes file of this invention.

FIG. 3 is an illustration of the item and classification attributes relationship file, which associates item identifiers with classification attributes.

FIGS. 4A-4E illustrate the results of queries on the item classification trees for the attributes function, shape, material, thread and finish, respectively.

FIG. 5 is an illustration of the components of an attribute-based classification and retrieval system implemented using modifiable parameter templates stored in the relational database.

FIG. 6 illustrates the contents of the classification parameter template table.

FIG. 7 illustrates the contents of the item classification parameter table, which is an expansion of the item and classification attributes relationship file of FIG. 3.

FIGS. 8 illustrate respectively the results of queries on the attributes function, material, finish and thread for a specific item in the database.

DETAILED DESCRIPTION OF THE PREFERRED EMBODIMENT

Figure 9A:
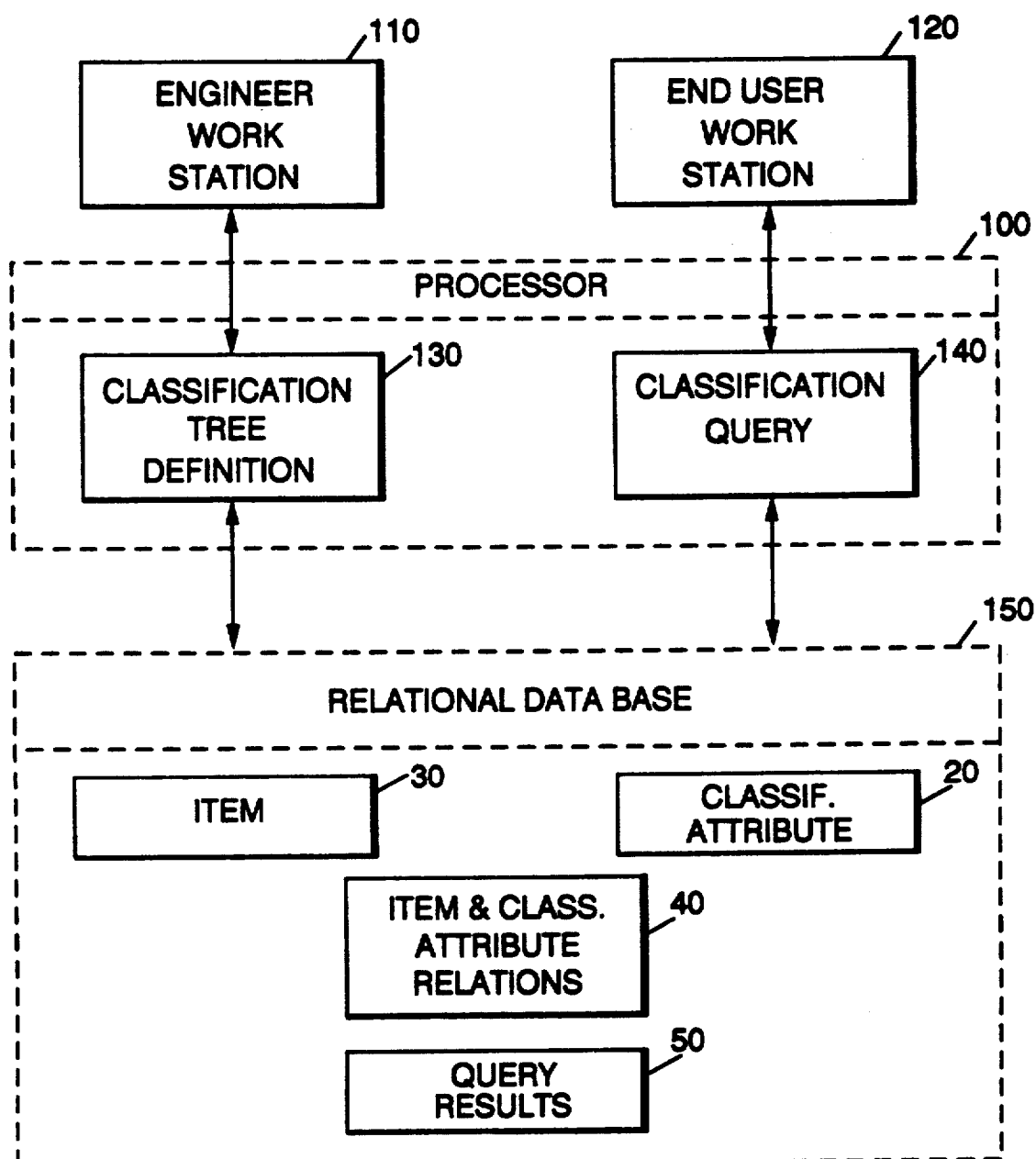
FIGS. 9A-9B represents functional block diagram implementations of the attribute-based classification and retrieval system.
Figure 9B:
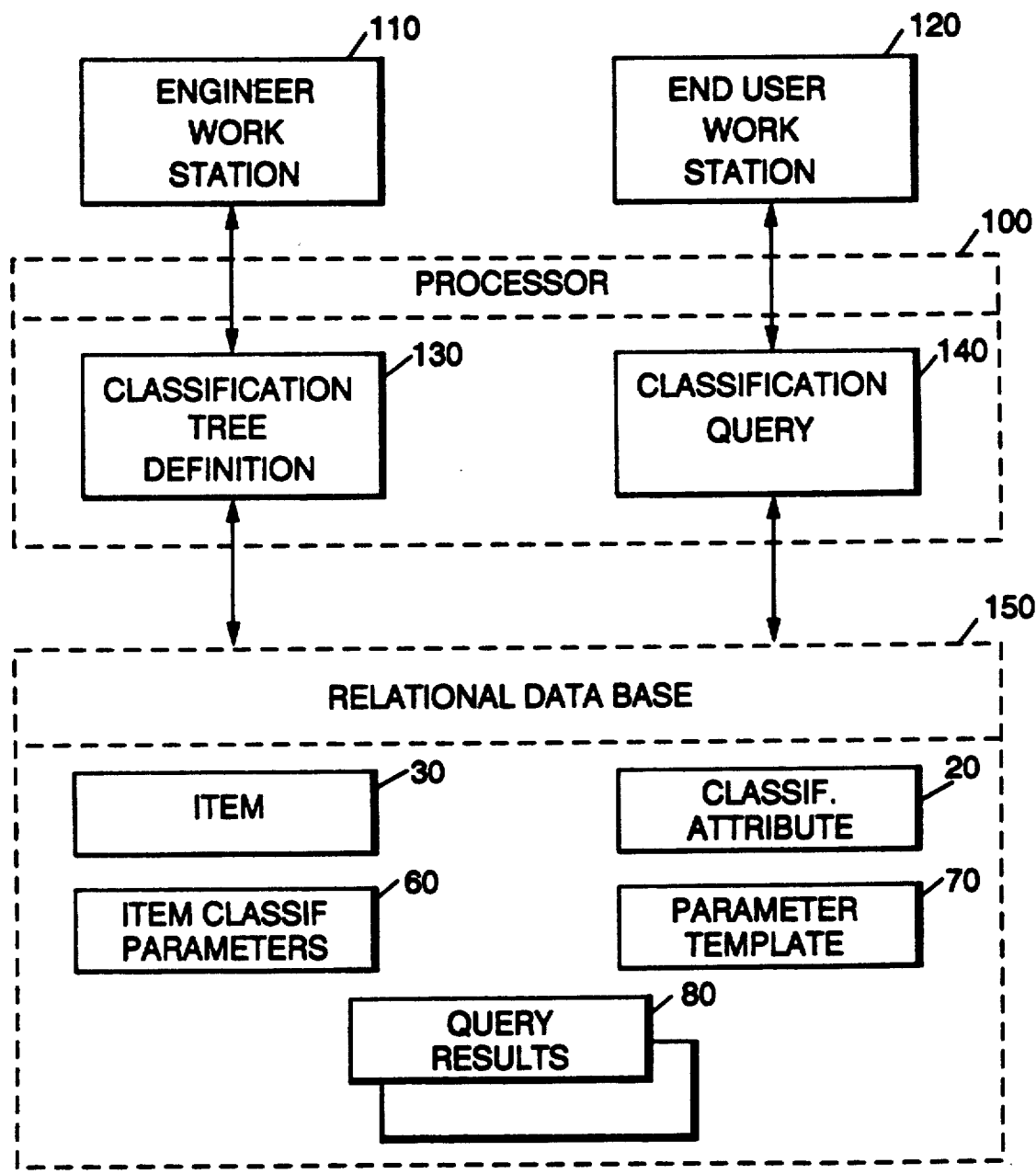

The codeless classification system of this invention enables a group technology system to classify and locate items with similar attributes. Functional block diagram implementations of this invention are depicted in FIGS. 9A-9B. The depiction in FIG. 9B represents the preferred embodiment of this invention and differs from FIG. 9A in that it provides for a more extensive query capability as will be explained below. However, in each instance the main components are mainframe processor 100, direct access storage device (DASD) 150, engineer workstation 110 and end user workstation 120. The database designer working at engineer workstation 110, using the contents of item file 30 stored in the relational database on DASD 150, interacts with the classification tree definition application 130 running on processor 100 to create the unique files comprising the item classification and retrieval system which are also stored in the relational database on DASD 150. In FIG. 9A these database files are identified as classification attributes file 20 and item and classification attributes file 40. In FIG. 9B these database files are identified as classification attributes file 20, item classification parameters file 60, and classification parameter template file 70. The composition and creation of these files is discussed below. End user workstation 120 interacts with these database files through classification query system application 140 running on processor 100. The results of these interactive queries are stored in query results file 50 for the embodiment of FIG. 9A and in multiple query results files 80 for the embodiment shown in FIG. 9B. For both embodiments, the query results files are stored on DASD 150.

Figure 1:
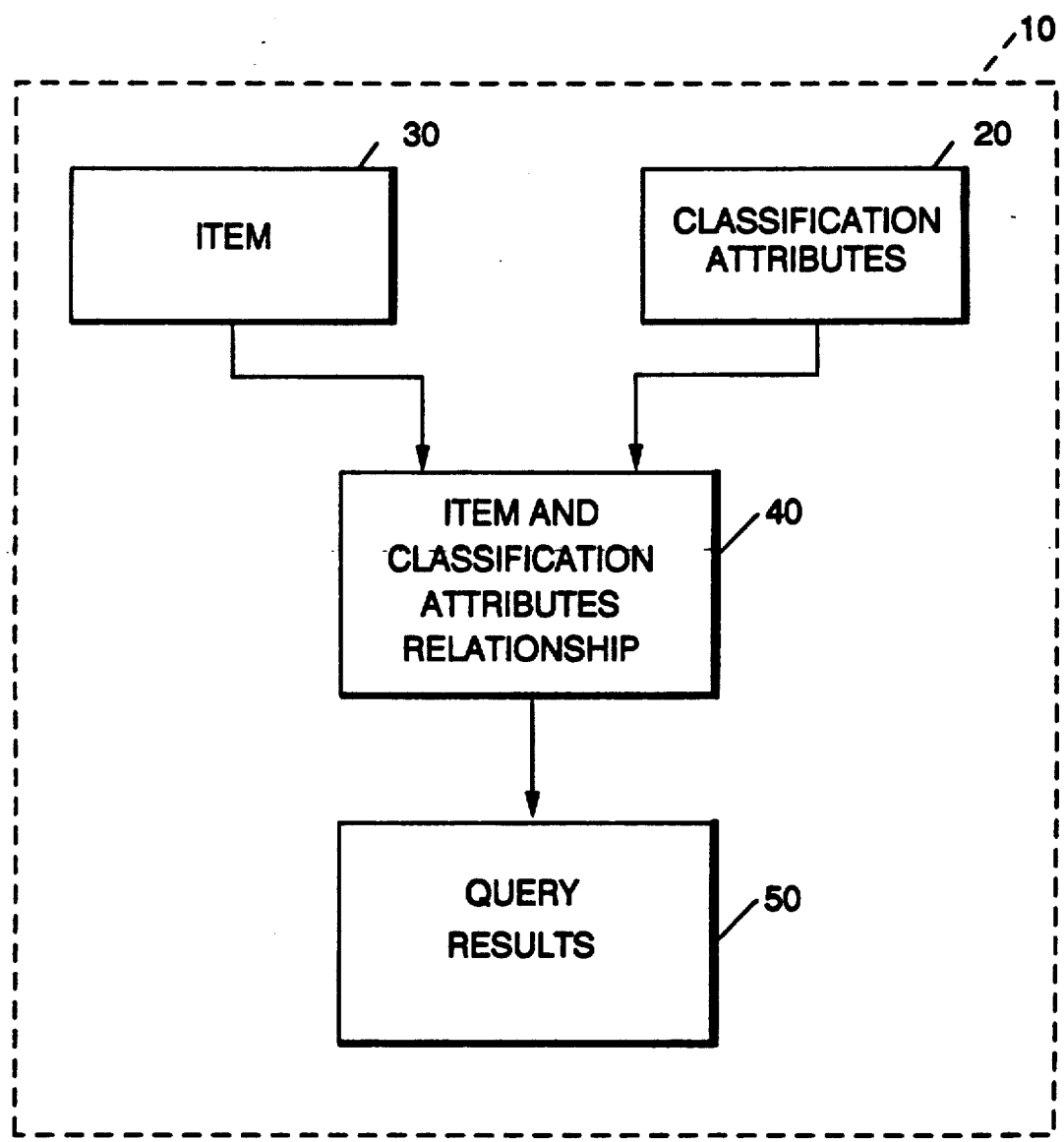
FIG. 1 is an illustration of the components of an attribute-based classification system stored in the relational database.

Illustrated in FIG. 1 are the components of the attribute-based item classification system 10 which comprises the set of logical data files shown in FIG. 9A. In the prior art, the item file 30 contains the item classification codes. In the present invention, the item classification codes are no longer stored in a data field in item file 30. The item file 30 only participates in defining a relationship between the items in item file 30 and the classification attributes in classification attribute file 20. The item and classification attribute relationship data is stored in item and classification attributes relationship file 40. The results of any query on the classification attributes are stored in the query results file 50. It only contains the item identifiers for items which satisfy the query. These item identifiers in query results file 50 can then be used to obtain more detail about the items which are available in the item file 30.

FIG. 2 contains a table representing the database storage of the classification attributes. The data contained in the table includes the identification of all classification attributes, their descriptions, relative level number within the classification tree starting at level 0 for the root level and an indicator which identifies the leaf nodes within the classification tree. It also contains the parent attribute identifier which depicts one-to-many relationships between the classification attributes to represent the classification trees containing root nodes, branch nodes and leaf nodes. In this example, the classification attributes are organized in a tree structure, rather than in a network structure, by including a pointer to the parent attribute identifier for each classification attribute. A classification attribute which does not point to a parent attribute is a root node attribute. A classification attribute which is not a parent of any other attribute is a leaf node attribute. Optionally, the attribute usage count is also stored to help optimize queries by selecting a path with smaller usage count where multiple attributes are queried concurrently.

FIG. 3 shows a table representing the database storage of the relationships between items and classification attributes. This table, which is input by the user is specific to item classification and represents the many-to-many relationships between items and classification attributes for leaf node attributes only. The intersection data may consist of unique item parameters pertaining to the specific leaf nodes.

The database management system used to implement the classification attributes file 20 and the item and classification attributes relationship file 40 can be any of several products currently available, but for purposes of the preferred embodiment, IBM Database 2 (DB2) is used. DB2 is a relational database management system, but it will be understood by those skilled in the art that other databases, including hierarchical databases, can be used. The interactive query system in the preferred embodiment is IBM's Structured Query Language (SQL) which provides efficient and direct on-line query access to DB2 data. SQL is independent of the stored data structure and has operators which can join information from several tables.

FIGS. 4A-4E illustrate the results of several item classification tree queries. The illustrations show the entire trees starting at the root node. Although they are shown for item classification trees, similar trees can be constructed for other business entities such as tools and facilities. FIG. 4A contains the results of an item classification function tree query. Queries can be made on specific branches of the tree and at any level in the tree hierarchy. A search on fasteners in the classification attribute table would yield all screws, rivets, bolts and nuts. FIGS. 4B-4E show the results of item classification tree queries for shape, material, thread and finish, respectively.

The interpretation of the attributes may be different for different business entities. For example, for items the trees represent the shape, the material, the thread, or the finish of the item. However, for tools or facilities, the trees represent the shape of the items or the material that can be worked using the tool or facility. Likewise, the thread or finish trees may represent the threads or finish that can be produced using the tool or facility.

In the preferred embodiment of the codeless classification system of this invention illustrated in FIG. 9B, business entity attributes are defined using modifiable templates as will be explained below. This extended classification system can then be implemented using precompiled query programs such as those using static Structured Query Language (SQL) calls thereby providing an enhanced retrieval capability. New attributes can be defined and queried without changing the query program.

FIG. 5 illustrates the components of the attribute-based classification and retrieval system 15 implemented using modifiable parameter templates stored in the relational database. Comparison with FIG. 1 shows the same item file 30 and classification attribute file 20. Two query results files 80 are used as work tables for complex queries involving multiple classification trees with different root nodes. The item and classification attributes relationship file 40 of FIG. 1 has been expanded into the item classification parameters file 60 shown in FIG. 5. The expanded file 60 contains detailed item parameter values. Each parameter value may be stored as a character string or as a single valued number or a range of numbers. Multiple columns are provided for storing each parameter value along with the unit of measure. A finite number of parameter values may be associated with each hierarchical path within a root node in the classification tree.

Since different classification attributes require different types of item parameters, classification parameter template 70 is used to define variable column headings for different classification attributes. For example, fasteners have diameter and length parameters. Fasteners which are screws have the thread length parameter. However, fasteners which are rivets do not have a thread length parameter. The templates for fasteners or rivets contain diameter and length as parameter names. The template for screws contains diameter, length, and thread length as parameter names. The parameter values for diameter, length and thread length are stored in item classification parameter file 60. Each set of parameter values is associated with user definable parameter names contained in a template stored in a classification parameter template file 70. Each node in a hierarchical path can have a different template containing a different combination of the same finite number of parameters set.

The results of any query on the classification attributes are stored in the two query results files 80. The query results files 80 are used as intermediate tables to satisfy certain types of classification queries which require successive iterations for selecting items, or other business entities and processes, where each iteration satisfies a subset of selection criteria. The query results files 80 only contain the item identifiers for items that satisfy the query. Item identifiers in query results file 80 are then used to obtain more detail about specific items from item file 30 and item classification parameters file 60.

The database storage of the classification parameter template file 70 is shown in FIG. 6. This file contains one or more parameter templates for each node of the classification trees. The templates contain parameter names which are presented to the users for proper interpretation of parameter values stored in the item classification parameter file 60. Only one template per node is used for item classification as indicated by the template class code column which contains item indication. However, additional templates per node are used for other entity classification such as routing or facilities classification. The templates applicable to the leaf nodes contain all parameter names applicable to the item. Templates for higher level nodes contain only the common parameter names which apply to all lower level nodes in the hierarchical path.

An illustration of the database storage of the item classification parameters file 60 is provided in FIG. 7. It details the relationships between items and classification attributes. This table represent many-to-many relationships between items and classification attributes for leaf node attributes only. The intersection data consists of unique item parameters pertaining to the specific leaf nodes. The data is stored in a standard format for all leaf nodes and the interpretation of data is determined by the unique parameter template for each leaf node as was shown in FIG. 6.

FIGS. 8A-8D illustrate the results of tree queries for function, material, finish and thread, respectively. In FIG. 8A the attribute values for the root attribute function through the level 3 attribute are obtained from the classification attributes file 20. Other attribute values are obtained from the item classification parameters file 60 and the column headings, such as length, diameter, etc., are obtained from the classification parameter template file 70. FIG. 8B shows the attribute values for the root attribute material through the level five attribute. The attribute values for the root attribute finish through the level 3 attribute obtained from classification attribute file 20 are shown in FIG. 8C. The column headings, such as dimension 1, dimension 2, and plating are obtained from classification parameter template file 70. The other attribute values are obtained from the item classification parameters file 60. FIG. 8D shows the attribute files for root attribute thread through the level 3 attribute as obtained from classification attributes file 20. Column headings, such as nominal thread diameter, are obtained from classification parameter template file 70.

Complex queries involve multiple classification trees with different root nodes. An example of a complex query is to look for all fasteners (function tree) made of brass (material tree) having a diameter between 5 and 10 millimeters and a length between 1.0 and 2.5 centimeters. This involves two successive searches, one for the function tree and one for the material tree. The item numbers satisfying the first search criteria are recorded in the first of the query results files 80. During the second search, the first query results file is joined to the item classification parameters file 60 to limit the search to the small set of items already found during the first search. If more than two searches are necessary in performing a complex query, the results of the second search are stored in the second query results file; the results of a third search are stored in the first query results file, etc.

While the invention has been particularly shown and described with reference to the particular embodiment thereof, it would be understood by those skilled in the art that various changes in form and details may be made therein without departing from the spirit and scope of the invention.

Having thus described our invention, what we claim and desire to secure by letters patent is as follows:

1. An attribute-based method of item classification and retrieval for group technology applications for implementation on a computer system wherein said computer system has an installed database system for storing database files including an item file on an external storage device and an interactive query system for retrieval of information stored in said database system in response to a query made by an operator at a workstation electrically connected to said computer system, said method comprising the steps of:

generating interactively at said workstation a plurality of multi-level classification attribute data structures with each data structure having at least one attribute identifier and, using said database system, storing said plurality of classification attribute data structures in a classification attributes file on said external storage device;

for each item stored in said item file, retrieving an associated item identifier and selecting interactively at said workstation a plurality of attribute identifiers from the plurality of attribute data structures stored in said classification attributes file pertaining to said item identifier to form a plurality of item identifier-attribute identifier pairs, and storing said plurality of item identifier-attribute identifier pairs in an item and classification attributes relationship file; and entering a first query interactively by said operator at said workstation using said interactive query system to perform a search on at least one attribute identifier in said item and classification attributes file, retrieving each said item identifier that includes said at least one attribute identifier as part of the stored item identifier-attribute identifier pair, and, using said database system, storing each said item identifier retrieved by said query in a query results file.

2. The attribute-based method of item classification and retrieval of claim 1 including entering a second query interactively by said operator at said workstation using said interactive query system to perform a search on at least one attribute identifier in said classification attributes file, retrieving the multi-level classification attribute data structure that contains said at least one attribute identifier, and, using said database system, storing said retrieved multi-level classification attribute data structure in a query results file.

3. An attribute-based codeless item classification and retrieval system for group technology applications for implementation on a computer system wherein said computer system has an installed database system for storing database files including an item file on an external storage device and interactive query system for retrieval of information stored in said database system in response to a query made by an operator at a workstation electrically connected to said computer system, said codeless item classification and retrieval system comprising:

- a first database table located on said external storage device for storing a plurality of multi-level classification attribute data structures, with each data structure having at least one attribute identifier;
- a second database table located on said external storage device for storing a plurality of item identifier-attribute identifier pairs, said item identifier-attribute identifier paris being determined by said operator associating at least one attribute identifier from said first database table with each item identifier contained in said item file; and
- a third database table located on said external storage device for storing the results of queries entered interactively by said operator at said workstation using said interactive query system and performed on said plurality of item identifier-attribute identifier pair stored in said second database table and on said plurality of multi-level classification attribute data structures stored in said first database table.

4. An attribute-based method of item classification and retrieval for group technology applications for implementation on a computer system wherein said computer system has an installed database system for storing database files including an item file on an external storage device and a query system for retrieval of information stored in said database system in response to a query made by an operator at a workstation electrically connected to said computer system, said method comprising the steps of:

- generating interactively at said workstation a plurality of multi-level classification attribute data structures with each structure having at least one attribute identifier and, using said database system, storing said plurality of classification attribute data structures in a classification attributes file on said external storage device;
- generating interactively at said workstation a plurality of modifiable templates with each template defining at least one parameter name associated with each attribute identifier stored in said classification attributes file and, using said database system, storing said plurality of modifiable templates in a classification parameter template file on said external storage device;
- for each item stored in said item file, retrieving an associated item identifier and selecting interactively at said workstation a plurality of attribute identifiers from the plurality of attribute data structures stored in said classification attributes file pertaining to said item identifier to form a plurality of item identifier-attribute identifier pairs, and for each item identifier-attribute identifier pair determining a parameter value corresponding to each parameter name stored in said classification parameter template file that is associated with the attribute identifier, and storing said plurality of item identifier-attribute identifier paris along with said parameter value corresponding to each associated parameter name in an item classification parameters file; and
- entering a first query interactively by said operator at said workstation using said interactive query system to perform a search on at least one attribute identifier in said item classification parameters file, retrieving each said item identifier-attribute identifier pair along with the parameter value corresponding to each associated parameter name that is associated with said at least one attribute identifier, and using said database system, storing each said item identifier-attribute identifier pair in one of a plurality of query results file.

5. The attribute-based method of item classification and retrieval of claim 4 including performing a series of interrelated queries on said item classification parameters file wherein a first query entered interactively by said operator at said workstation is made on a first attribute identifier to identify each item identifier that contains the first attribute in said plurality of item identifier-attribute identifier pairs with the results of the first query being stored in a first query results file using said database system, and a second query entered interactively by said operator at said workstation is made on a second attribute identifier wherein the scope of the search is limited to the item identifiers stored in said first query results file to identify those item identifiers in said first query results file that also have the second attribute with the results of the second query being stored in a second query results file using said database system.

6. The attribute-based method of item classification and retrieval of claim 5 wherein any subsequent searches are used to further limit the scope of the search to the item identifiers found in the immediately preceding search that have a specific parameter value corresponding to the associated parameter name.

7. The attribute-based method of item classification and retrieval of claim 5 including entering a second query interactively by said operator at said workstation using said interactive query system to perform a search on at least one attribute identifier in said classification attributes file, retrieving the multi-level classification attribute data structure that contains said at least one attribute identifier, and, using said database system, storing said retrieved multi-level classification attribute data structure in one of a plurality of query results files.

8. An attribute-based codeless item classification and retrieval system for group technology applications for implementation on a computer system wherein said computer system has an installed database system for storing database files including an item file on an external stores device and an interactive query system for retrieval of information stored in said database system in response to a query made by an operator at a workstation electrically connected to said computer system, said codeless item classification and retrieval system comprising:

a first database table located on said external storage device for storing a plurality of multi-level classification attribute data structures, with each structure having at least one attribute identifier;

a second database table located on said external stores device for storing a plurality of item identifier-attribute identifier pairs and a set of parameter values corresponding to each item identifier-attribute identifier pair, said item identifier-attribute identifier pairs being determined by said operator associating at least one attribute identifier from said first database table with each item identifier contained in said item file;

a third database table located on said external storage device for storing a plurality of parameter templates containing at least one parameter name associated with each classification attribute identifier stored in said first database table; and a fourth database table located on said external storage device for storing the results of queries entered interactively by said operator at said workstation using said interactive query system and performed on said plurality of item identifier-attribute identifier pairs stored in said second database table and performed on said plurality of multi-level classification attribute data structures sores in said first database table.

* * * * *